(12) United States Patent
Ishii et al.

(10) Patent No.: US 11,288,209 B2
(45) Date of Patent: Mar. 29, 2022

(54) CONTROLLING CACHE ENTRY REPLACEMENT BASED ON USEFULNESS OF CACHE ENTRY

(71) Applicant: Arm Limited, Cambridge (GB)

(72) Inventors: Yasuo Ishii, Austin, TX (US); Thibaut Elie Lanois, Antibes (FR); Houdhaifa Bouzguarrou, Valbonne (FR)

(73) Assignee: Arm Limited, Cambridge (GB)

( * ) Notice: Subject to any disclaimer, the term of this patent is extended or adjusted under 35 U.S.C. 154(b) by 101 days.

(21) Appl. No.: 16/577,271

(22) Filed: Sep. 20, 2019

(65) Prior Publication Data

US 2021/0089472 A1  Mar. 25, 2021

(51) Int. Cl.
*G06F 12/121* (2016.01)
*G06F 12/0875* (2016.01)
*G06F 9/38* (2018.01)
*G06F 9/30* (2018.01)

(52) U.S. Cl.
CPC ........ *G06F 12/121* (2013.01); *G06F 9/30043* (2013.01); *G06F 9/3804* (2013.01); *G06F 9/3842* (2013.01); *G06F 12/0875* (2013.01); *G06F 2212/1044* (2013.01); *G06F 2212/452* (2013.01)

(58) Field of Classification Search
CPC .... G06F 12/121; G06F 9/3842; G06F 9/3804; G06F 12/0875; G06F 9/30043; G06F 2212/1044; G06F 2212/452; G06F 9/3806; G06F 9/3848; G06F 12/0864; G06F 12/0897; G06F 12/128; G06F 2212/1016

USPC .......................................... 711/133, 134, 137
See application file for complete search history.

(56) References Cited

U.S. PATENT DOCUMENTS

| 10,719,327 | B1 * | 7/2020 | Al-Otoom | G06F 9/3848 |
|---|---|---|---|---|
| 2005/0015555 | A1 * | 1/2005 | Wilkerson | G06F 12/122 |
| | | | | 711/128 |
| 2008/0235453 | A1 * | 9/2008 | Emma | G06F 12/127 |
| | | | | 711/122 |
| 2009/0210663 | A1 * | 8/2009 | Sartorius | G06F 9/3804 |
| | | | | 712/207 |
| 2010/0191893 | A1 * | 7/2010 | Oberlaender | G06F 12/0846 |
| | | | | 711/3 |
| 2017/0195447 | A1 * | 7/2017 | Panagos | H04L 67/2814 |
| 2018/0275993 | A1 * | 9/2018 | Levitan | G06F 9/3848 |
| 2018/0293175 | A1 * | 10/2018 | Chang | G06F 12/127 |
| 2019/0391923 | A1 * | 12/2019 | Gupta | G06F 12/0868 |
| 2020/0082280 | A1 * | 3/2020 | Orion | G06F 12/0862 |
| 2020/0104137 | A1 * | 4/2020 | Natarajan | G06F 9/3848 |
| 2020/0409856 | A1 * | 12/2020 | Navon | G06F 12/123 |

* cited by examiner

*Primary Examiner* — Hong C Kim
(74) *Attorney, Agent, or Firm* — Nixon & Vanderhye P.C.

(57) ABSTRACT

An apparatus comprises a cache comprising cache entries, each cache entry storing cached information and an entry usefulness value indicative of usefulness of the cached information. Base usefulness storage circuitry stores a base usefulness value. Cache replacement control circuitry controls, based on a usefulness level determined for a given cache entry, whether the given cache entry is selected for replacement. The cache replacement control circuitry determines the usefulness level for the given cache entry based on a difference between the entry usefulness value specified by the given cache entry and the base usefulness value stored in the base usefulness storage circuitry.

20 Claims, 6 Drawing Sheets

CONTROLLING CACHE ENTRY REPLACEMENT BASED ON USEFULNESS OF CACHE ENTRY

BACKGROUND

Technical Field

The present technique relates to the field of data processing. More particularly, it relates to a cache.

Technical Background

A data processing system may have a number of cache structures, for example a data cache for storing data obtained from memory for faster access by a processing pipeline, an instruction cache for storing instructions for fetching for execution, or a prediction cache structure which stores information for generating predictions for controlling speculative operations in the processing system.

SUMMARY

At least some examples provide an apparatus comprising:
a cache comprising cache entries, each cache entry to store cached information and an entry usefulness value indicative of usefulness of the cached information;
base usefulness storage circuitry to store a base usefulness value; and
cache replacement control circuitry to control, based on a usefulness level determined for a given cache entry, whether the given cache entry is selected for replacement; in which:
the cache replacement control circuitry is configured to determine said usefulness level for the given cache entry based on a difference between the entry usefulness value specified by the given cache entry and the base usefulness value stored in the base usefulness storage circuitry.

At least some examples provide an apparatus comprising:
means for caching, comprising cache entries, each cache entry to store cached information and an entry usefulness value indicative of usefulness of the cached information;
means for storing a base usefulness value; and
means for controlling, based on a usefulness level determined for a given cache entry, whether the given cache entry is selected for replacement; in which:
the means for controlling is configured to determine said usefulness level for the given cache entry based on a difference between the entry usefulness value specified by the given cache entry and the base usefulness value stored in the means for storing.

At least some examples provide method comprising:
storing cache entries in a cache, each cache entry comprising cached information and an entry usefulness value indicative of usefulness of the cached information;
storing a base usefulness value in base usefulness storage circuitry; and
controlling whether a given cache entry is selected for replacement, based on a usefulness level determined for a given cache entry; in which:
said usefulness level for the given cache entry is determined based on a difference between the entry usefulness value specified by the given cache entry and the base usefulness value stored in the base usefulness storage circuitry.

Further aspects, features and advantages of the present technique will be apparent from the following description of examples, which is to be read in conjunction with the accompanying drawings.

DESCRIPTION OF EXAMPLES

A cache may be provided having a number of cache entries, with each cache entry storing some cached information, such as some data, an instruction or set of instructions, or prediction information for generating a prediction to be used for controlling speculative operations. Occupancy of the cache may be controlled by cache replacement control circuitry based on a replacement policy. The cache may have a limited number of cache entries and may not be able to store cache information for every possible address. Performance may be highest if the cache replacement control circuitry can allocate entries which are more useful than other entries. To track how useful entries are, each cache entry may have an associated entry usefulness value which indicates usefulness of the cached information. The particular criteria used to set the entry usefulness value may depend on the purpose of the cache and the cached information stored in the cache entry. The techniques discussed can be applied to a range of different types of cache for which there may be different rules for setting the entry usefulness value. Nevertheless, in general the cache entry may be provided with an entry usefulness value which can be used by the cache replacement control circuitry, when deciding which cache entry should be replaced to make way for a new entry. Hence, when attempting to allocate a new entry into the cache, the cache replacement control circuitry may control, based on the entry usefulness value for a given cache entry, whether that given cache entry is selected for replacement.

One approach for controlling cache replacement based on usefulness may be to simply use the entry usefulness value in the cache entries themselves as the only indication of usefulness, and so the entry usefulness value in a given cache entry may directly identify the relative usefulness of that cache entry. For example, if the entry usefulness value in a given cache entry indicates a level of usefulness greater than a certain threshold then that entry could be prevented from being replaced, while entries with a lower usefulness indicated by the entry usefulness value could be favoured for a replacement.

However, sometimes it may be desirable to be able to reduce the usefulness of many cache entries at a time. For example, a global usefulness reduction event may be determined, which indicates that many entries should have their usefulness reduced. Such global reductions in usefulness of cache entries can be difficult to implement because a cache may typically have a limited number of read/write ports and so can only handle a limited number of updates per cycle. Hence, it may take a relatively large number of cycles to go through a cache and reduce the entry usefulness values in each cache entry.

In the techniques discussed below, the cache replacement control circuitry uses a base usefulness value stored in base usefulness storage circuitry to determine whether a given cache entry is selected replacement. Rather than determining the usefulness level for the given cache entry based on the entry usefulness value of that given cache entry alone, the usefulness level for the given cache entry may be determined based on a difference between the entry usefulness value specified by the given cache entry and the base usefulness value stored in the base usefulness storage circuitry. The base usefulness value can be shared among a group of entries. By determining entry usefulness based on a difference between an entry usefulness value specified by the given cache entry itself and the base usefulness value shared between entries, this means that, while it is still possible to indicate different levels of usefulness for different entries, if a large group of entries all need to have their usefulness decreased, then this can be done more efficiently by updating the base usefulness value, eliminating the need to update the individual entry usefulness values for each of the cache entries subject to the global usefulness reduction. This can greatly improve performance when performing global usefulness reductions.

Hence, in response to a global usefulness reduction event, the cache replacement control circuitry may increment the base usefulness value stored in the base usefulness storage circuitry. This may effectively cause the usefulness level for the cache entries to be reduced, but without needing to update the entry usefulness values in many cache entries. A single write to the base usefulness storage circuitry can be enough to implement a global reduction in cache entry usefulness.

The global usefulness reduction event could be one of a number of types of event. In one example the global usefulness reduction event could be elapse of a predetermined period since an initialisation event or a previous global usefulness reduction event. For example the initialisation event could be power up of the apparatus including the cache, or a reset event where a reset signal is supplied to trigger resetting of storage elements of the apparatus to a default reset state. The elapse of a predetermined period could be measured in different ways. For example, the period may be defined as a certain period of time, a certain number of processing cycles, a certain number of lookups to the cache, or a certain number of allocations of new entries into the cache. For example, a counter may be provided which is incremented each time one of these events happen (passage of time, passage of processing cycles, lookup to the cache or allocation to the cache) and when the counter reaches a certain value, this may trigger the global usefulness reduction event and hence the incrementing of the base usefulness value. It can be useful to provide an age-dependent reduction in global usefulness, because this provides a way to clear out entries which have not been accessed for some time.

Another example of a global usefulness reduction event can be a cache allocation metric exceeding a threshold. The cache allocation metric could be any metric which depends on the frequency with which cache entries are allocated into the cache or on how often attempts are made to allocate entries to the cache. For example the cache allocation metric could be one of: a number or rate of attempts to allocate new cache entries to the cache; a number or rate of successful allocations of new cache entries to the cache; or a number or rate of failed allocations of new cache entries to the cache, where a failed allocation comprises the cache replacement control circuitry determining that a new cache entry cannot be allocated because no cache entry is able to be selected for replacement.

Hence, the cache allocation metric could track overall attempts to allocate a new cache entry to the cache, or could track successful allocations when the new cache entry was able to be allocated, or could track failed allocations when it was not possible to allocate a new cache entry because no existing cache entry was able to be selected for a replacement (e.g. because the existing cache entries all had usefulness levels that were too high). In cases where the cache allocation metric is dependent on a rate of allocation attempts, successful allocations or failed allocations, the rate could be evaluated in different ways, for example relative to time or relative to the number of cache accesses or the number of allocation attempts. In general, if the number or rate of successful allocations, overall attempts to allocate (successful or unsuccessful) or failed allocations is relatively high then this may be an indication that it could be useful to reduce the base usefulness value so that it is more likely that new information attempted to be allocated into the cache can be allocated.

In particular, it can be particularly useful for the cache allocation metric to depend on the number or rate of failed allocations, because this may be an indication that there are a number of entries in the cache which previously were found to be particularly useful, but if those entries are allowed to remain indefinitely then eventually the program code being executed may move beyond the region of code which found those entries useful and so if there is no mechanism for reducing entry usefulness then such entries would effectively reduce the overall effective capacity of the cache. Hence if the number or rate of failed allocations reaches a given level then it may be desirable to provide a global reduction in usefulness so that there is a chance that such previously useful entries which are blocking new allocations can be replaced. If it turns out that the previously useful entries are actually still useful then a subsequent allocation attempt may reintroduce those entries, but if it turns out that those replaced entries are not used again then performance can be improved by allowing other entries to make use of the cache capacity.

On the other hand, in response to an entry usefulness event which indicates that cached information in a particular cache entry was found to be useful, the cache replacement control circuitry may increment the entry usefulness value for the particular cache entry. Hence, while entry usefulness level may be reduced globally by incrementing the base usefulness value when a global usefulness reduction event occurs, there is also support for boosting the usefulness of an individual entry when that individual entry is found to be useful. The entry usefulness event could be one of different types. For example, for some types of cache the entry usefulness event could simply be that a cache hit was detected for the particular cache entry, which indicates that the cached information was required by the processor or other device requesting the information. For example this type of entry usefulness event could be useful for a non-predictive cache structure such as a data cache, instruction cache or translation lookaside buffer or other type of address translation cache. On the other hand, for caches which provide prediction information indicative of a prediction for controlling speculative operations, the entry usefulness event could be a determination that the prediction provided by the particular cache entry is correct. In this case, even if there is a cache hit in an entry then if the prediction turns out to be incorrect that entry's entry usefulness value would not be incremented. In some cases, on determining that the prediction for a particular cache entry is incorrect, it may be possible for the cache replacement control circuitry to decrement the entry usefulness value for that particular cache entry, but this is not essential as the global reduction of usefulness may provide for less useful entries to be removed anyway and it may be preferred that the previously determined level of usefulness is not disrupted by a few incorrect predictions. For some types of predictor which have multiple caches of prediction entries and select between two or more alternative predictions provided by entries in the multiple caches, whether an entry usefulness event is detected for a given entry could also depend on whether the entry was selected to form the prediction (e.g. an entry which hits and provides a correct prediction may still not be subject to the entry usefulness event if actually another cache's prediction was selected in preference to that entry's prediction).

The entry usefulness value and the base usefulness value can be used to identify a difference between the entry usefulness value and the base usefulness value. The usefulness level of the cache entry depends on the difference between the entry usefulness value and the base usefulness value. The cache replacement control circuitry may use that usefulness level to decide whether to prevent or allow a given cache entry to be selected for replacement. The usefulness level could be used in different ways. For example in some methods, the usefulness levels of a number of entries could be compared and the entry with the lowest usefulness level could be selected. This approach would guarantee that an allocation is always possible. However, for some implementations it may be preferred that successful allocation of a new entry is not necessarily guaranteed. For example the cache replacement control circuitry could operate according to a replacement policy which prevents a given cache entry being selected for replacement when the usefulness level is greater than or equal to a predetermined threshold. With this approach, then if all the available entries which could be selected have their usefulness level greater than or equal to the threshold, then allocation may fail and it may not be possible to allocate the new entry. This may be based on the principle that once entries have achieved a given level of usefulness then it may not be desirable to evict them to make way for other data (which could turn out to be less useful).

The global usefulness reduction approach discussed above and the provision of the base usefulness value can be particularly useful for a cache replacement control circuit which uses such a threshold-based replacement policy because such a replacement policy may eventually cause blocking of new allocations, and the global usefulness reduction can be a way of ensuring that it is eventually possible for new entries to be allocated. The provision of the base usefulness storage circuitry and the evaluation of the usefulness level based on the difference between the entry usefulness value and the base usefulness value helps to improve efficiency of global usefulness reductions.

When the base usefulness value is increased, this may result in some cache entries being "left behind" such that their entry usefulness value is now less than the base usefulness value, so that the difference between the entry usefulness value and the base usefulness value may be negative. Some implementations may evaluate the difference between the entry usefulness value and the base usefulness value with a subtractor which provides a subtraction result with sufficient number of bits for distinguishing every possible negative value and every possible positive value which could result from subtracting the base usefulness value from the entry usefulness value. However, this may result in at least one additional bit being needed to represent the difference between the entry usefulness value and the base usefulness value, compared to the number of bits which would be used in a cache replacement controller which simply used the entry usefulness value as a direct indication of cache entry usefulness (independent of the base usefulness value) as in the alternative approach discussed earlier. In some implementations it may be deemed acceptable to incur the extra circuit area cost associated with processing a wider usefulness level value in the cache replacement control circuitry (this additional overhead may be incurred by using wider signal paths and wider sets of logic gates to process the additional bit).

However, in other implementations it may be deemed that it is not necessary to be able to identify every possible negative value which could result from subtracting the base usefulness value from the entry usefulness value. An approach may be used where the usefulness difference between the entry usefulness value and the base usefulness value may support values of either −1, 0, or one or more positive values, but may not support negative values below −1. This can reduce the number of bits needed and reduce the circuit overhead of the cache replacement control circuitry.

However, with this approach there is a risk that if there is a further global usefulness reduction event when a given entry has the entry usefulness value equal to the base usefulness value −1, then that further increment of the base value may result in the difference being −2, which may not be distinguishable from the maximum positive value of numeric expression of the difference between the entry usefulness value and the base usefulness value when a reduced bit width difference counter is used. Hence this could risk an entry of low usefulness being accidentally misidentified as being of high usefulness.

To guard against this, below-base-usefulness checking circuitry can then be provided to identify one or more below-base-usefulness cache entries for which the entry usefulness value is less than the base usefulness value, and if one or more below-base-usefulness cache entries are identified, then the entry usefulness value for those entries can be updated to be equal to the base usefulness value. Hence some circuitry is provided to identify those entries for which their entry usefulness value has lagged behind the base usefulness value, and in that case boost their entry usefulness so that the difference becomes zero, which guards against the risk of a subsequent global usefulness reduction event making those entries look like extremely useful entries when actually they are not particularly useful.

When the entry usefulness value equals (base usefulness value −1) this can be treated as a special value. When the entry usefulness value is less than the base usefulness value for a given cache entry, the usefulness level may be determined to be the same as the usefulness level that would be determined if the entry usefulness value has equaled the base usefulness value. Hence, the usefulness difference of −1 is treated the same as the usefulness difference of 0, for the purpose of determining whether to replace a cache entry. Also, the special value of 'base usefulness minus 1' may be detected as an indication that the below-base-usefulness circuitry should update the entry usefulness value for the entry to match the base usefulness value.

The below-base-usefulness checking circuitry could identify the below-base-usefulness cache entries at different times. In some cases, when a prediction lookup is made, if any below-base-usefulness cache entries are identified in the set of entries subject to the lookup, then those entries could have their entry usefulness value updated by the below-base-usefulness checking circuitry. Alternatively, at the time of determining which entry to replace, if the entries available for replacement include entries with a below-base-usefulness value of the entry usefulness value then these could have their entry usefulness values updated to match the base usefulness value. Another option is that the below-base-usefulness checking circuitry may not be triggered by a particular prediction lookup or an allocation attempt into the cache, but could perform a periodic scrub of the cache entries to go through each cache entry of the cache and check whether they are below-base-usefulness cache entries, independent of what particular addresses are being looked up or allocated into the cache. Hence, in general it can be useful to provide the below-base-usefulness checking circuitry, to reduce the chance that due to the limited number of bits of the difference value used to express the usefulness level, and the occurrence of multiple global usefulness reduction events between successive updates of the entry usefulness value on a regular access to the corresponding entry, that entry has lagged behind the base usefulness value and is at risk of a further global usefulness reduction making it look like an entry of very high usefulness.

Nevertheless, the below-base-usefulness checking circuitry, while helpful, is not essential in all embodiments, for example those embodiments which provide a wider binary value for expressing the usefulness level which distinguishes multiple negative values from the positive values, or an embodiment in which it is considered that the risk of a below-base-usefulness entry being subject to a further global usefulness reduction event is low enough to make the overhead of the below-base-usefulness checking circuitry unjustified.

The cache could be a single-ported cache or a dual-ported cache. A dual-ported cache has two write/read ports and so it may be capable of two simultaneous read or write operations per cycle. In contrast, a single-ported cache may only be capable of a single read or write operation per cycle, because there may only be access ports for supplying a single address and access request per cycle. Even for dual-ported cache random access memory, the technique discussed above can be useful to reduce the performance cost of implementing a global usefulness reduction. However, the technique can be particularly useful in cases where the cache comprises at least one module of single-ported random access memory, because a single-ported cache RAM would be incapable of performing a simultaneous read and write in the same cycle. Updating an entry usefulness value within a particular entry to reduce entry usefulness may include the old value of the entry usefulness value being read and incremented, and the new value being written back, so may require both a read operation and a write operation. In a dual-ported cache or a cache with more than two ports, it may be possible to pipeline the reads and the writes for the respective cache entries whose usefulness level is to be reduced, so that the performance cost of a global usefulness reduction may be more limited. However, for a single-ported cache RAM, it is not possible to pipeline reads and writes in this way and so each entry whose usefulness needs to be reduced may require at least two cycles, one read and one write. Hence, for single-ported RAM the performance cost of a global usefulness reduction would be particularly expensive in alternative approaches which do not use the base usefulness value. By providing the base usefulness storage circuitry as discussed above for a single-ported cache RAM, the performance can be greatly improved when implementing global usefulness reductions. This has the knock on effect that the cache is not blocked from handling other types of cache accesses for as long, which can then provide better performance for data processing being performed which may require cached information from the cache.

The techniques discussed above can be used for a wide variety of types of cache. For example, the cache could comprise one of a data cache, an instruction cache or an address translation cache such as a translation lookaside buffer.

Also, the technique could be applied to predictive storage structures which may cache prediction information which is indicative of a prediction for controlling speculative operations. For example the predictive storage structure could be a branch prediction structure for which the cached information comprises branch prediction information indicative of predicted branch instruction behaviour. The branch prediction structure could for example be part of a branch target buffer which caches information for predicting whether a given address is expected to include a branch instruction at all or for predicting branch target addresses or other properties of branches. Also the branch prediction instruction could comprise a branch direction prediction structure for which the branch prediction information may indicate whether a given branch should be taken or not. The techniques discussed above could also be used for other types of prediction storage structure, not related to branch prediction, such as an address prediction structure for predicting patterns of addresses of instructions to be executed or data accesses to be made to memory, which could be used to initiate early requests to obtain data or instructions from memory or a cache. It will be appreciated that other aspects of processing apparatus behaviour could also be predicted using a predictive storage structure. For any of such types of cache, cache entries may provide an indication of the usefulness of that particular entry and this may be qualified by the base usefulness value as discussed above so that a global usefulness reduction can be performed more efficiently.

This technique is particularly useful for a type of branch direction predictor called a tagged-geometric (TAGE) branch predictor. A TAGE branch predictor includes a number of TAGE tables which include entries each specifying at least a tag, a branch direction prediction indication which indicates a prediction of whether a branch should be taken, and the entry usefulness value of the type discussed above. For example the branch direction prediction indication could be a confidence value which indicates both the taken/not-taken prediction and also a level of confidence in whether that prediction is correct. TAGE branch direction predictors provide a number of tables for which the tags in different TAGE tables are based on different lengths of branch history information. The branch history information could for example be an indication of the taken/not-taken outcome for the last N branches encountered, or could be based on addresses of the most recently encountered branches or a combination of both outcome and address.

An advantage of the TAGE approach is that by providing tables whose tags are based on different lengths of branch history information, this provides a trade off between the likelihood that when there is a hit in the branch direction predictor the prediction is accurate, and the likelihood that hits in the TAGE predictor occur sufficiently often that a useful prediction can be made. In general tables indexed based on longer sequences of branch history information may be more likely to generate an accurate prediction for the current point of the program at which the prediction is required, but may encounter misses more often since it is more likely that the same part of the program may be reached by a different route to the one encountered following the sequence of branch history used to generate a tag. On the other hand a TAGE table indexed with a shorter length of branch history information may have a higher hit rate as there may be more different patterns of branch history which may alias to the same tag value, but it is more likely that the prediction may be incorrect because the chance of an incorrect alias is higher for a shorter sequence of branch history. The TAGE predictor may for example look up multiple TAGE tables based on comparisons of the different tags of different branch history length against corresponding index values representing the current point of the program, and for any TAGE tables which generate a hit for their respective tags, the output of the TAGE table corresponding to the longest sequence of branch history information for which a cache hit was identified can be used to perform the prediction.

Such TAGE branch predictors are one of the most accurate branch prediction schemes known at present. However, one consequence of the TAGE approach is that there is some redundancy in that a given point of the program may have allocated many different prediction entries in the respective TAGE tables, based on the different lengths of branch history used to generate the tags (and indices), and so eventually once the branch predictor has been sufficiently trained that the predictor now recognises that a particular length of branch history gives a prediction with reasonable confidence, predictions may subsequently be based on the prediction entry in one particular TAGE table, but there may still be a number of other cache entries in other TAGE tables which correspond to the same point in the program but are no longer being used for predictions because they are based on shorter sequences of branch history. Hence, a global usefulness reduction event can be particularly useful in TAGE branch direction predictors to provide a way of eventually removing entries which are no longer being used. However, as the global usefulness reduction may require many entries to have their usefulness level decreased, then if the alternative approach discussed above which only uses entry usefulness values to express usefulness level is used then especially if single-ported cache RAMs are used for the TAGE tables, this is difficult to implement without extreme loss of performance. By using the base usefulness value as discussed above, this can greatly improve the feasibility of implementing a TAGE branch direction predictor.

In the TAGE example, the base usefulness value may be shared between at least two TAGE tables of the TAGE branch direction predictor. Hence it is not necessary to provide separate base values for each TAGE table. A single base value can be shared to reduce the overall cost.

The cache described above may comprise a certain subset of the TAGE tables of the TAGE branch direction predictor. It is not necessary for this subset to include all of the TAGE tables, although that is one possible implementation. In some cases the subset does include all of the TAGE tables. In other examples the subset is a proper subset which excludes at least one TAGE table. Hence in the example where the subset of TAGE tables used as the cache described above excludes at least one TAGE table, then for that excluded TAGE table the cache replacement control circuitry may determine whether cache entries in that excluded TAGE table are selected for replacement based on the entry usefulness value of those cache entries, independent of the base usefulness value stored in the base usefulness storage circuitry. For example, the excluded TAGE table could be at least one TAGE table which depends on a longer sequence of branch history information than the subset of TAGE tables for which the base usefulness value approach is used. This may recognise that it is less common that entries allocated into the TAGE table which is indexed and tagged based on a longer length of branch history information gain sufficient confidence to be marked as useful, compared to TAGE tables indexed/tagged based on shorter sequences of branch history information. Therefore, there may be less pressure for storage capacity in the longest length table of the TAGE branch direction predictor. It may be preferred that once entries in the longest length indexed/tagged table have become sufficiently useful that they would resist being replaced, then it would not be desirable for a global usefulness reduction event to affect those entries, because once an entry has become sufficiently useful that a reasonable prediction can be made based on a long length of branch history information, it is likely that any other entry replacing the existing entry would actually turn out to be less useful that the existing entry. As the probability of overall performance being improved by evicting a useful entry from the longest length TAGE table is low, the longest length TAGE table may not be subject to the global usefulness reduction event.

Figure 1:
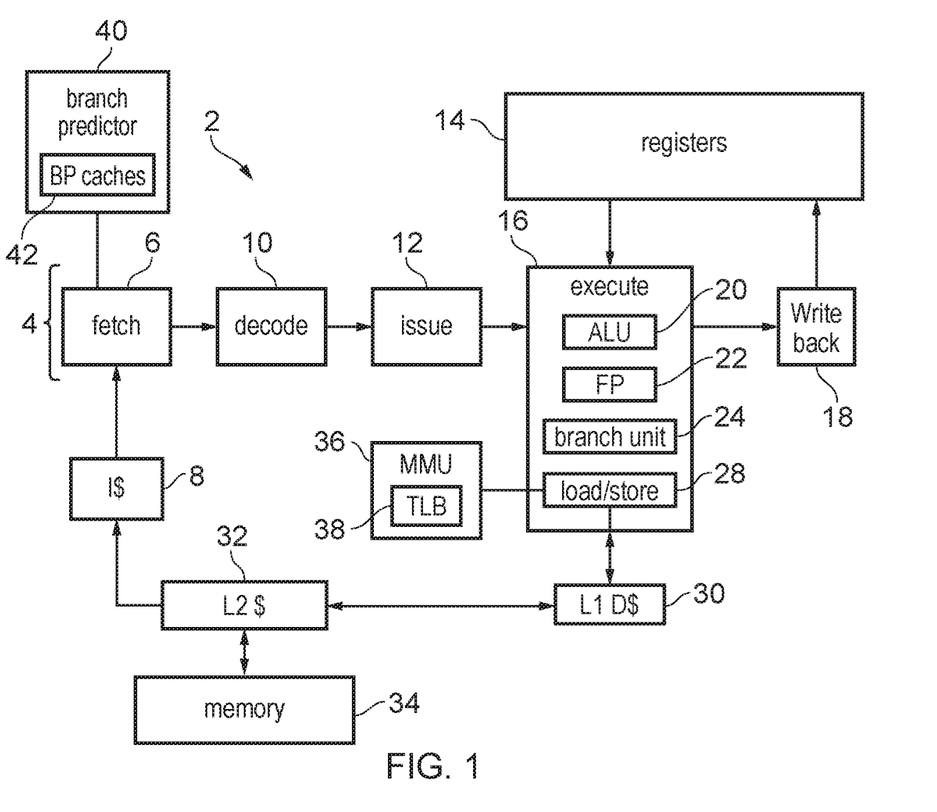
FIG. 1 schematically illustrates an example of a data processing apparatus having a number of types of cache.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values, a branch unit 24 for evaluating the outcome of branch operations and adjusting the program counter which represents the current point of execution accordingly; and a load/store unit 28 for performing load/ store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The apparatus 2 also has a branch predictor 40 which may include one or more branch prediction caches 42 for caching prediction information used to form predictions of branch behaviour of branch instructions to be executed by the branch unit 24. The predictions provided by the branch predictor 40 may be used by the fetch stage 6 to determine the sequence of addresses from which instructions are to be fetched from the instruction cache 8 or memory system. The branch prediction caches may include a number of different forms of cache structure, including a branch target buffer (BTB) which may cache entries specifying predictions of whether certain blocks of addresses are predicted to include any branches, and if so, the instruction address offsets (relative to the start address of the block) and predicted target addresses of those branches. Also the branch prediction caches 42 could include branch direction prediction caches which cache information for predicting, if a given block of instruction addresses is predicted to include at least one branch, whether the at least one branch is predicted to be taken or not taken.

Hence, the data processing system may include a number of cache structures, including for example the data cache 30, instruction cache 8, level 2 cache 32, TLB 38 and/or branch prediction caches 42. It will be appreciated that other types of cache structure could also be provided.

Figure 2:
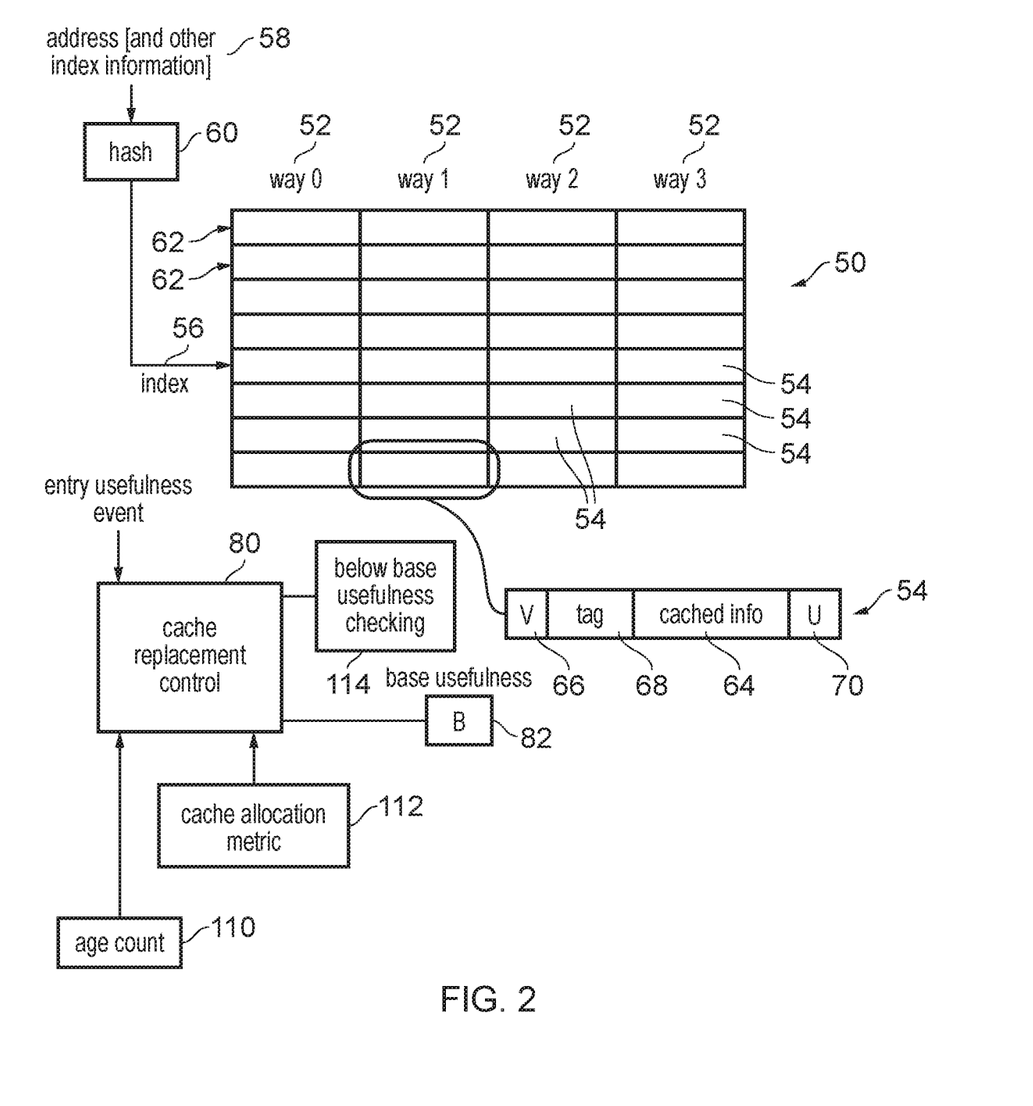
FIG. 2 shows an example of a cache and cache replacement control circuitry.

FIG. 2 schematically illustrates an example of a cache 50 which could be any of the types of caches 8, 30, 32, 38, 42 as discussed above. In this example the cache 50 is shown as a set-associative cache having a number of ways 52 of cache entries 54. The cache 50 is indexed based on an index value 56 which is derived as a function of an address 58 and optionally other index information (the other index information will for conciseness not be mentioned again below, but it will be understood that references to the address used for the index generation hash 60 can also include other index information such as branch history). The hash function 60 used to derive the index 56 from the address 58 could simply be the extraction of a subset of bits of the address, or could be a more complex hash function which manipulates the bit values of the address to produce an index value 56. Multiple different values of the address could map to the same index value 56. The index value 56 selects a set 62 of cache entries 54 which is to be looked up to determine whether the cache stores cached information associated with the supplied address. In this example the cache is a 4-way set-associative cache, which means that for any given address there are 4 possible locations which could store the related cached information. It will be appreciated that the set-associative cache organisation is just one example and other caches could be direct-mapped or fully-associative.

As shown in FIG. 2, each cache entry 54 includes some cached information 64, a valid bit (V) 66, a tag 68 and an entry usefulness value (U) 70. The cached information can be any information to be stored in the cache. The purpose of this information will vary based on the type of cache. For example for the instruction cache 8 the cached information may be a set of one or more instructions, for the data cache 30 the cached information may be a block of data that can be accessed by a load/store instruction executed by the load/store unit 28, or for the level 2 cache 32 the cached information could be either instructions or data. For the TLB 38 the cached information may be address translation information which can be used to provide a mapping between a virtual address and a physical address or intermediate address, or which identifies addresses in memory at which page table entries for providing such a mapping can be located. For the TLB 38 the cached information could also include access permissions controlling access to certain address regions. On the other hand, for a prediction cache structure like the branch prediction caches 42, the cached information may include prediction information which can be used to control speculative operations within the processing pipeline 4. For the branch prediction caches 42 the prediction information is used to control speculative fetching of subsequent instructions beyond a branch, but for other types of prediction cache structure the speculative operations could be prefetching of data/instructions into a cache or early initiation of loads to memory for example.

The valid bit 66 indicates whether a cache entry is valid. The tag value 68 provides a value for distinguishing between the multiple addresses that share the same value of the index value 56, so that on a lookup to the cache it can be checked whether the indexed entry 54 actually stores cached information associated with the requested address. For example the tag 68 could correspond to a portion of the address which is not used as input to the hash 60 to provide the index 56.

The usefulness value 70 may be used for control of replacement of cache entries. Cache replacement control circuitry 80 is provided to manage cache replacement. When a lookup is made to the cache and none of the indexed entries 54 are valid and have a tag 68 which matches the supplied address 58, then a cache miss is detected and an attempt may be made to allocate a new entry for the looked up address 58. When a new entry needs to be allocated then if there are any invalid entries available in the set 62 to which the requested address is allowed to be allocated, then one of those invalid entries can be selected and allocated with the cached information 64 for the looked up address that missed in the cache previously.

On the other hand, if there are no invalid entries then the entry usefulness values 70 of the respective set 62 of cache entries 54 can used to identify which entry should be evicted and replaced with the new entry. The entry usefulness value 70 for a given entry can be incremented when it is found that the entry has provided useful cached information. For example, for information storage cache structures, which do not provide a prediction, such as the L1 and L2 caches 8, 30, 32 or the TLB 38, an entry could be regarded as useful if a request hits against that entry, as this may indicate that the contents of the entry were needed to support the processing by the processing pipeline 4. Hence, in these types of caches when there is a cache hit, the entry usefulness value 70 of the hit entry 54 may be incremented to boost the recorded usefulness of that entry so that it is less likely that the hit entry will be chosen for replacement when other information is to be allocated to the cache. For predictive cache structures like the branch prediction caches 42, it may be preferred not to boost the usefulness of the entry in cases where there was a hit but the prediction provided turned out to be incorrect. For such predictive cache structures the entry usefulness value 70 may be incremented in response to detecting that a hit entry provided a prediction which turned out to be correct.

The cache replacement control circuitry 80 also has access to a base usefulness storage element 82 (for example implemented using a register or other storage circuit) which stores a base usefulness value B which is shared among the entries 54 of the cache 50. The cache replacement control circuitry 80 controls cache entry replacement based on the individual entry usefulness values 70 of the cache entries 54 and the base usefulness value B stored in the base usefulness storage circuitry 82. In general, the usefulness level of a given cache entry 54 is dependent on the difference between the entry usefulness value U 70 of that particular cache entry 54 and the base usefulness value B. If an entry's usefulness level (U−B) is greater than or equal to a certain threshold, then the cache replacement control circuitry 80 prevents that entry from being replaced to make way for a newly allocated entry. On the other hand, if the usefulness level U−B is less than the threshold then the entry is allowed to be replaced.

Figure 3:
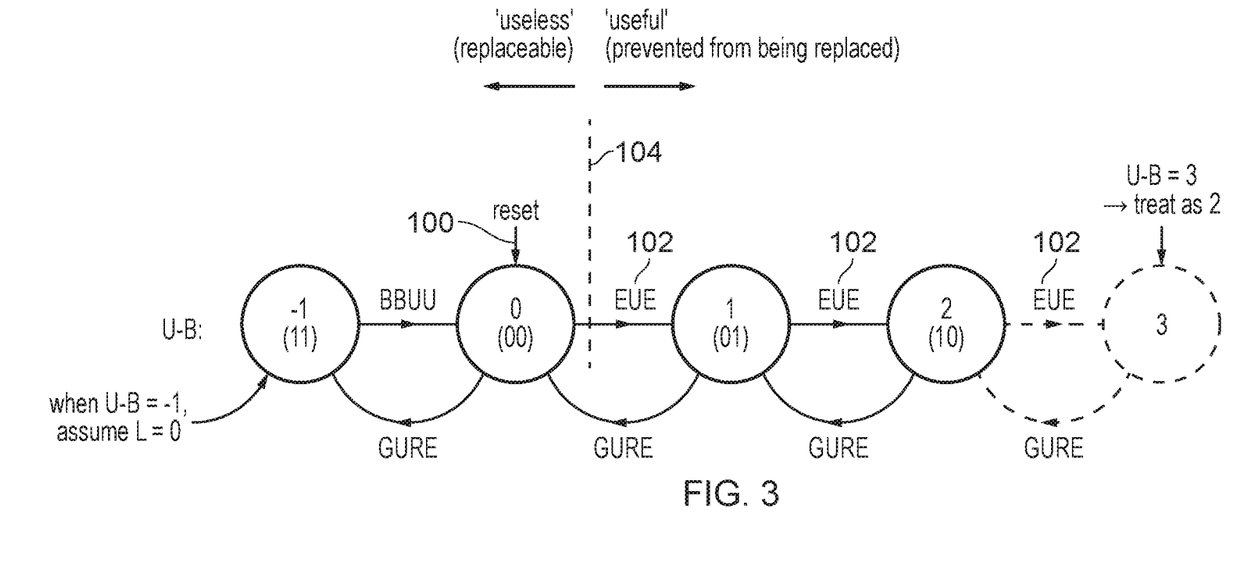
FIG. 3 shows a state machine illustrating transitions in usefulness level of a given cache entry.

FIG. 3 shows a state diagram illustrating an example of how the usefulness level U−B can be represented. In this example the entry usefulness value 70 and the base usefulness value B are both represented as 2-bit binary values and the usefulness level expressing the difference U−B is also represented using a 2-bit value to save bit width and hence reduce hardware cost in the cache replacement control circuitry 80. Hence the difference U−B can have one of four possible values, binary 00, 01, 10 or 11. The binary value 11 represents U−B=−1, that is the state when the entry usefulness value U for a given entry is one less that the base usefulness value B. This −1 state is a special value which has a special purpose as discussed below. The other states of the different value U−B are used to represent the cases when U−B=0, 1 or 2 respectively.

On a system reset or initialisation event, the cache is initialised with the base usefulness value 82 equal to 0 and with the entry usefulness values 70 of each cache entry 54 equal to 0, and so each cache entry will be initialised in the state when U−B=0, as indicated by the reset transition 100 marked in FIG. 3. Subsequently, when cached information in the given cache entry is found to be useful (an entry usefulness event (EUE)), then the entry usefulness value U of the given entry is incremented and this means that the difference between the entry usefulness value and the base usefulness value, U−B, is also increased by 1. Hence, entry usefulness events 102 cause the difference value U−B to move to the next highest state as shown in the states diagram of FIG. 3. The entry usefulness event 102 could be a hit in the given cache entry or a determination that a prediction provided by the cache entry was correct as discussed above.

One may expect that if the base usefulness value B is 0 and the entry usefulness value U is 3 then it should be possible for the difference value U−B to equal 3. This is shown in the dotted line at the right hand side of FIG. 3. However, in this particular example, as the binary value 11 has been allocated to represent U−B=−1, representing the state where U−B=3 would require extra bits to express the difference value U−B, which would increase circuit overhead within the cache replacement control circuitry 80. As the threshold 104 for determining whether entries are able to be replaced may be set below U−B=2 (for example in this case the threshold is set equal to 1 so that entries with U−B=−1 or 0 are considered replaceable and entries with U−B=1 or 2 are considered non-replaceable), then it is not necessary to distinguish between cases where U−B=2 and U−B=3. Instead, the cache replacement control circuitry 80 may have some logic which, in the case where U−B=3, maps this to a difference value of 2 the same as if U−B actually equals 2. This avoids the need to provide an extra bit for accommodating the U−B=3 state. Hence, the state shown in dotted line for U−B=3 need not be provided.

The cache replacement control circuitry 80 may detect whether a global usefulness reduction event (GURE) has occurred, and if such an event occurs then the base usefulness value B in the base usefulness register 82 may be incremented. For example the CURE could be detected based on an age counter 110 shown in FIG. 2, which counts the elapse of a certain period, e.g. a period of time, number of processing cycles, number of lookups into the cache 50 or number of allocation attempts into the cache. The age counter could be reset on initialisation or on a reset of the processing system or power up, and could also be reset when a global usefulness reduction event occurs. Subsequently the age counter is incremented each time an event of a given type happens. The age counter increment event could be the passing of a certain block of time, passing of one or more processing cycles, or a lookup or allocation to the cache 50. When the counter reaches a certain threshold, then another global usefulness reduction event may be triggered. Alternatively, the cache replacement control circuitry 80 may maintain a cache allocation metric 112 which tracks some performance metric such a number or rate of attempts to allocate new cache entries to the cache, a number or rate of successful allocations of new cache entries to the cache or a number or rate of failed allocations of new cache entries to the cache. Here, a successful allocation is an allocation attempt when it is possible to select an entry for replacement to accommodate the new cache entry, while a failed allocation is an allocation attempt when it was not possible to allocate the new entry because no cache entry in the relevant set 62 was able to be selected for replacement because they had U−B values greater than the threshold. Hence, in some cases the cache replacement control circuitry 80 may determine that a global usefulness reduction event should be triggered when the cache allocation metric 112 exceeds a certain threshold. For example, the threshold could be exceeded when the number or rate of failed allocations is greater than a certain amount. By triggering a global reduction in cache entry usefulness (as opposed to a reduction of an individual cache entry's usefulness) when a certain period has elapsed or when a cache allocation metric indicates that there have been a relatively high volume of attempts at allocation, successful or failed, then this ensures that there is a mechanism for entries eventually to be reduced in usefulness so that other entries can be allocated into the cache. As shown in FIG. 3, when the base usefulness value B is incremented in response to the CURE then this results in the usefulness level (U−B) being decremented by 1. Hence, this may make some cache entries which were previously at U−B=1 go to U−B=0 which may make them replaceable.

When a global usefulness reduction is performed, the CURE may trigger some cache entries to have U−B transition from 0 to −1. That is, the increment to the base usefulness value may result in some cache entries becoming below-base-usefulness (BBU) entries whose usefulness value 70 has been left behind the base usefulness value B. The case when U−B=−1 is treated as a special case, and in this case the usefulness level L which is used by the cache replacement control circuitry 80 to make decisions on cache replacement is assumed to be 0, the same as if U−B was actually 0. That is, the states when U−B=−1 and U−B=0 are actually treated the same for the purpose of determining whether an entry can be replaced. However, the state when U−B=−1 is used as a trigger for below-base-usefulness checking circuitry 114 of FIG. 2 to update the entry usefulness value 70 of the BBU cache entry to increment that entry usefulness value 70 so as to move that cache entry back to the U−B=0 state. This is done so that there is less chance that another global usefulness reduction event will occur while a cache entry is still in the U−B=−1 state, because this could risk U−B then appearing to match the U−B=2 state because decrementing binary 11 results in binary 10. Such a transition would be undesirable because it may result in an entry which is actually one of the least useful entries in the cache appearing to be one of the most useful entries. Hence, by providing the BBU checking circuitry 114 which can check the cache for BBU entries having U−B=−1 and incrementing the entry usefulness value U for such entries, this transitions those left behind entries following to the U−B=0 state following a global usefulness reduction event.

The below-base-usefulness checking circuitry 114 can be implemented in different ways. In some cases the BBU checking circuitry 114 may be implemented as circuitry which periodically scrubs the cache 50 for entries which are in the U−B=−1 state, irrespective of whether those entries have been looked up recently. The period governing how often the BBU scrub is performed could be set to be shorter than the period associated with the age count 110 for triggering the global usefulness reduction event. Alternatively, the BBU checking circuitry 114 could be invoked on every cache lookup, to check whether any of the entries in the set 62 looked up have the entry usefulness value U equal to (B−1), and if so to increment the entry usefulness value U. Alternatively, rather than triggering the BBU check on each lookup, the BBE check could only be invoked when it is needed to allocate into the cache, as at this point the usefulness values 70 of the set of entries are being checked anyway to determine which entry can be replaced, and the BBU checking circuitry 114 could also examine whether there are any entries for which U−B=−1 and if so boost them to the U−B=0 state.

In summary, by providing the below base usefulness checking circuitry 114, this can enable U−B to be represented using a binary value of the same number of bits as U and B individually, which can help to reduce the circuit cost of implementing the cache replacement control circuitry 80.

It will be appreciated that the representation in FIG. 3 is just one example. Other examples could provide values for U, B, and U−B which use different numbers of bits, for example a 3-bit usefulness counter could be used for each and in this case there would be additional states in the state diagram shown in FIG. 3. Also, it is not essential for U−B to be encoded with the same number of bits as U and B themselves, or for U and B to have the same number of bits as each other. If it is considered to be acceptable for U−B to be wider than U and B then the state diagram may include the U−B=3 state shown in FIG. 3 and could also include subsequent states with negative values lower than −1, and in this case it may not be necessary to provide the below based usefulness checking circuitry 114 if the number of bits used to encode U−B is large enough that there is no risk of the largest positive value of U−B accidentally resulting from a global usefulness reduction event causing U−B to transition from the lowest negative value to the highest positive value.

Figure 4:
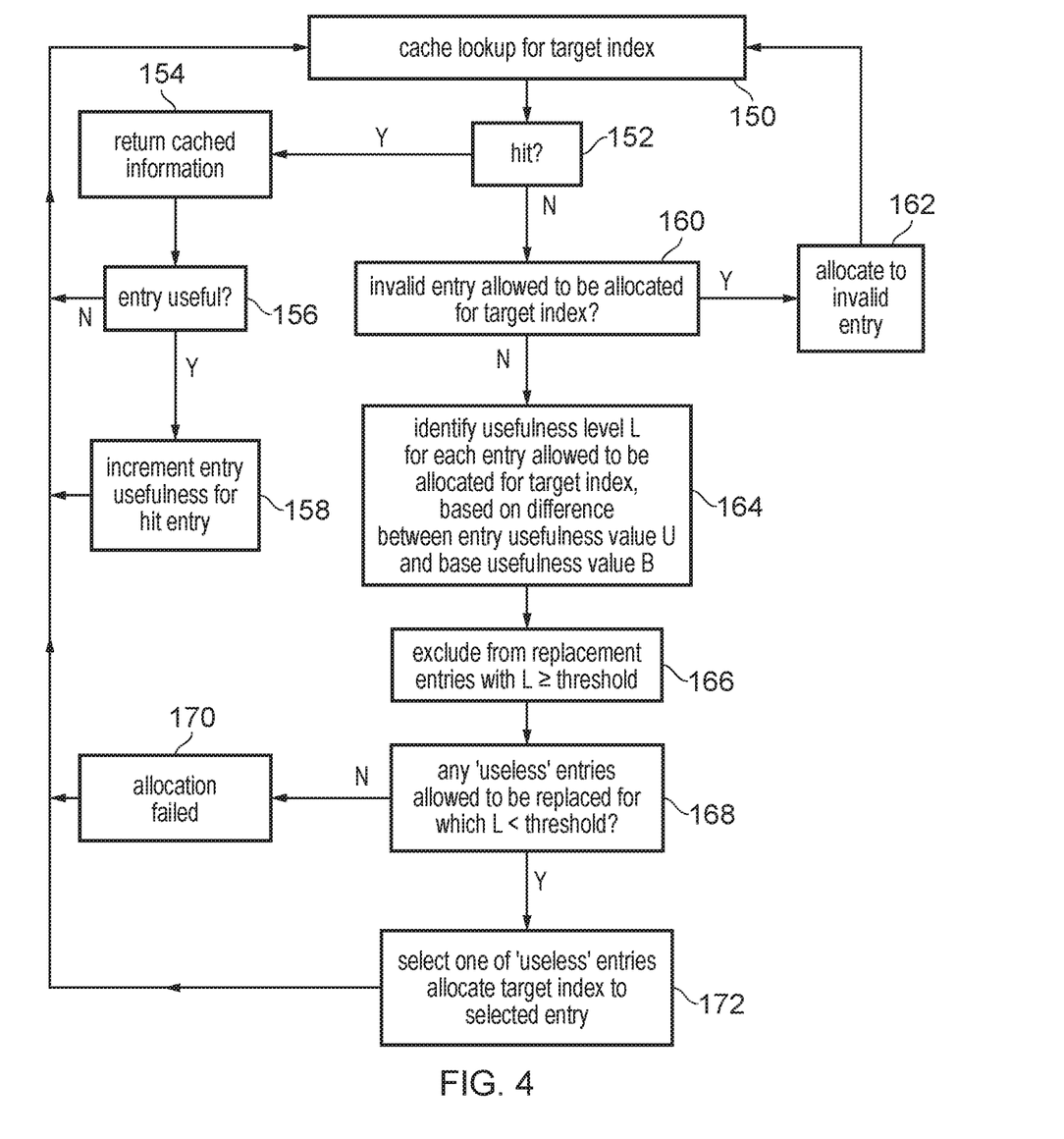
FIG. 4 is a flow diagram showing a method of controlling access to the cache, including replacement of cache entries on a cache miss.

FIG. 4 is a flow diagram showing a method of controlling cache lookups and replacements. At step 150 a lookup is made in the cache 50 for a given target index value 56. At step 152 it is determined whether there is a hit in the cache for that particular target index (that is whether one of the looked up set 62 of entries 54 is valid and includes a matching tag 68 which corresponds to the information used to generate the target index 56). If there is a cache hit then at step 154 cached information 64 is returned from the hit entry 54. At step 156 it is determined whether the hit entry was found to be useful. The entry may be considered useful in some examples whenever there is a hit, and in this case the outcome of step 156 may be always to continue to step 158 in which the entry usefulness value 70 for the hit entry is incremented. For other examples, in cases where there has been a hit in the cache there may be a further determination of whether the entry was useful, for example based on whether a prediction provided by the entry was correct. Hence, if the entry was considered useful then at step 158 the entry usefulness value is incremented, while if the entry was not considered useful then the method continues to step 150 to perform the next lookup in the cache.

If at step 152 it is determined that there was a miss in the cache for the target index 56 then at step 160 the cache replacement control circuitry 80 determines, based on the valid indications 66 of the looked up set 62 of cache entries 54 whether any of these entries are invalid. If one of the entries allowed to be allocated with information for the target index is invalid, then at step 162 an allocation is made to one of those invalid entries, and the method returns to step 150 for the next cache lookup.

On the other hand, if there are no invalid entries in the looked up set 62 (that is all the certain entries have already been allocated for other valid information) then at step 164 the cache replacement control circuitry 80 assesses the usefulness of the previously allocated entries in the looked up set 62. For each entry 84 in the set 62 which is allowed to be allocated with information for the particular target index 56 used for the lookup, the cache replacement control circuitry 80 determines the usefulness level L based on the difference between the entry usefulness value U 70 specified in the entry 54 and the base usefulness value B stored in the base usefulness register 82. In the example of FIG. 3, L=0 when U−B=−1, L=2 when U−B=3, and in other cases L=U−B. In other examples, the usefulness level L may be determined in a different way, for example, in the case where U−B is expressed with a greater number of bits then it may be simpler to determine the usefulness level L as equal to U−B directly.

Regardless of exactly how the usefulness level L is derived from the difference U−B, at step 166 the cache replacement control circuitry 80 determines that any of the set of entries 62 which have L greater than or equal to a certain threshold (e.g. the threshold is 1 in the example of FIG. 3) are excluded from being replaced. Hence, replacement of those entries with L greater than or equal to the threshold is prevented. At step 168 the cache replacement control circuitry 80 determines whether the set of entries 62 includes any "useless" entries which are allowed to be replaced, for which the usefulness level L is less than the threshold. If there are no such useless entries then at step 170 it is determined that allocation has failed and so no allocation is made into the cache for the target index. At this point the cache replacement controller 80 may update the cache allocation metric 112 to record an instance of allocation failing, which could be used to determine whether to trigger a global usefulness reduction as explained earlier. Following failure of allocation, the method proceeds from step 170 back to step 150 to perform a lookup for the next index of a subsequent cache access request.

On the other hand, if at step 168 it is determined that there is at least one "useless" entry which is allowed to be replaced because its usefulness level L was less than the threshold, then at step 172 one of the "useless" entries in the looked up set 62 is selected for replacement, and the cached information for the target index is allocated to the selected entry. For example this could involve storing data associated with the target index in the selected entry or starting to record prediction state for the address associated with the target index in the newly allocated entry.

Figure 5:
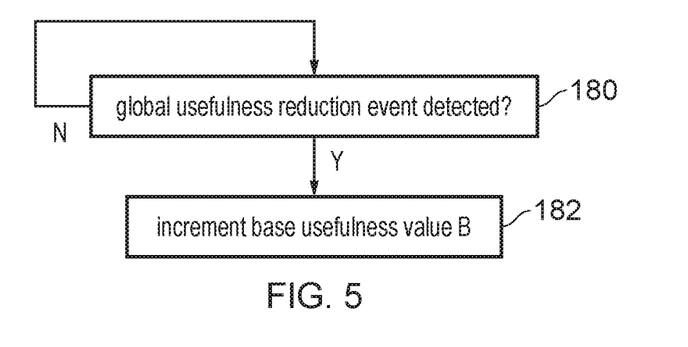
FIG. 5 shows an example of responding to a global usefulness reduction event.

FIG. 5 shows a flow diagram showing global usefulness reduction. At step 180 the cache replacement control circuitry detects whether any global usefulness reduction event has occurred. For example this could involve checking whether the age counter 110 has reached a threshold or checking whether the cache allocation metric 112 exceeds a threshold. When a global usefulness reduction event occurs then at step 182 the cache replacement controller 80 increments the base usefulness value B (and also the age counter 110 or cache allocation metric 112 may be reset). Hence, by expressing the usefulness level as a difference between the entry usefulness level U and the base performance value B, this means that a global reduction in usefulness for many cache entries can be implemented with a single write to the base usefulness storage circuit 82, which avoids the need to update individual entry's usefulness values 70, improving performance by reducing the time for which regular access to the cache so is blocked while performing usefulness updates.

Figure 6:
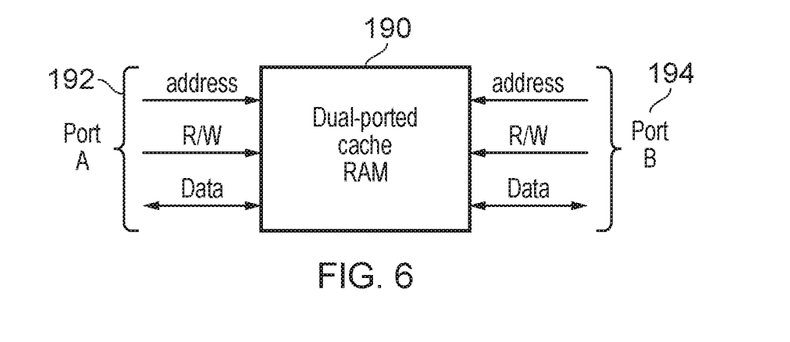
FIG. 6 shows an example of a dual-ported cache random access memory (RAM) module.
Figure 7:
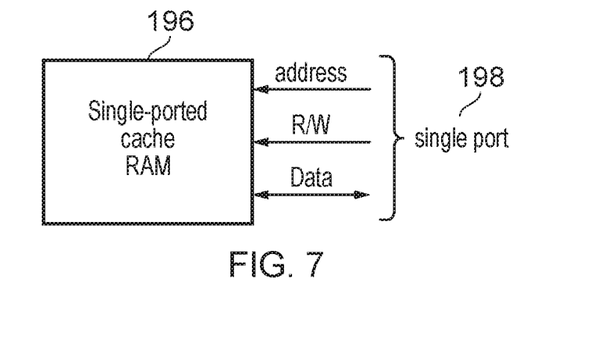
FIG. 7 shows an example of a single-ported cache RAM module.

This can be particularly useful for some types of cache depending on how many read/write ports are provided. As shown in FIG. 6, a dual ported cache RAM 190 could be used to implement the cache 50, and in this case the cache may include a first read/write port 192 and a second read/write port 194, which in each processing cycle can each provide a read or write request to the cache RAM 190. Hence, it is possible to perform both a read and a write to the cache in the same cycle (to different locations within the cache). In contrast, FIG. 7 shows a single-ported cache RAM 196 which only has a single read/write port 198 and so is only capable of either a read or a write in any given cycle. As a change to the entry usefulness value may depend on the previous value of the entry usefulness value 70 for a given cache entry, then an increment or decrement to the entry usefulness value may require both a read and a subsequent write to the given cache entry 54. Hence this may require two cycles of read and write accesses. For the single-ported cache RAM 196 of FIG. 7 this would have to be performed in two separate cycles and it would not be possible to pipeline these operations with read or writes to other entries as would be possible for the dual-ported cache RAM 190 of FIG. 6. Hence, if the base usefulness value 82 was not provided then for the single-ported cache RAM 196 a global usefulness reduction would be expensive in terms of performance because two cycles would be required for every cache entry whose usefulness level needs to be decreased. In contrast, by providing the base usefulness storage 82 and using the difference between the entry usefulness value 70 and the base usefulness value B to express the usefulness level of the entry used for cache replacement policy, this means that it is not necessary to update individual entries' usefulness values 70 on a global usefulness reduction event, which greatly improves performance by preventing the cache being blocked from regular cache lookups for many cycles. While the global usefulness reduction using the bases performance value increment is particularly useful for the single-ported cache RAM 196 it can still help improve performance for the dual-ported cache RAM 190 as well.

Figure 8:
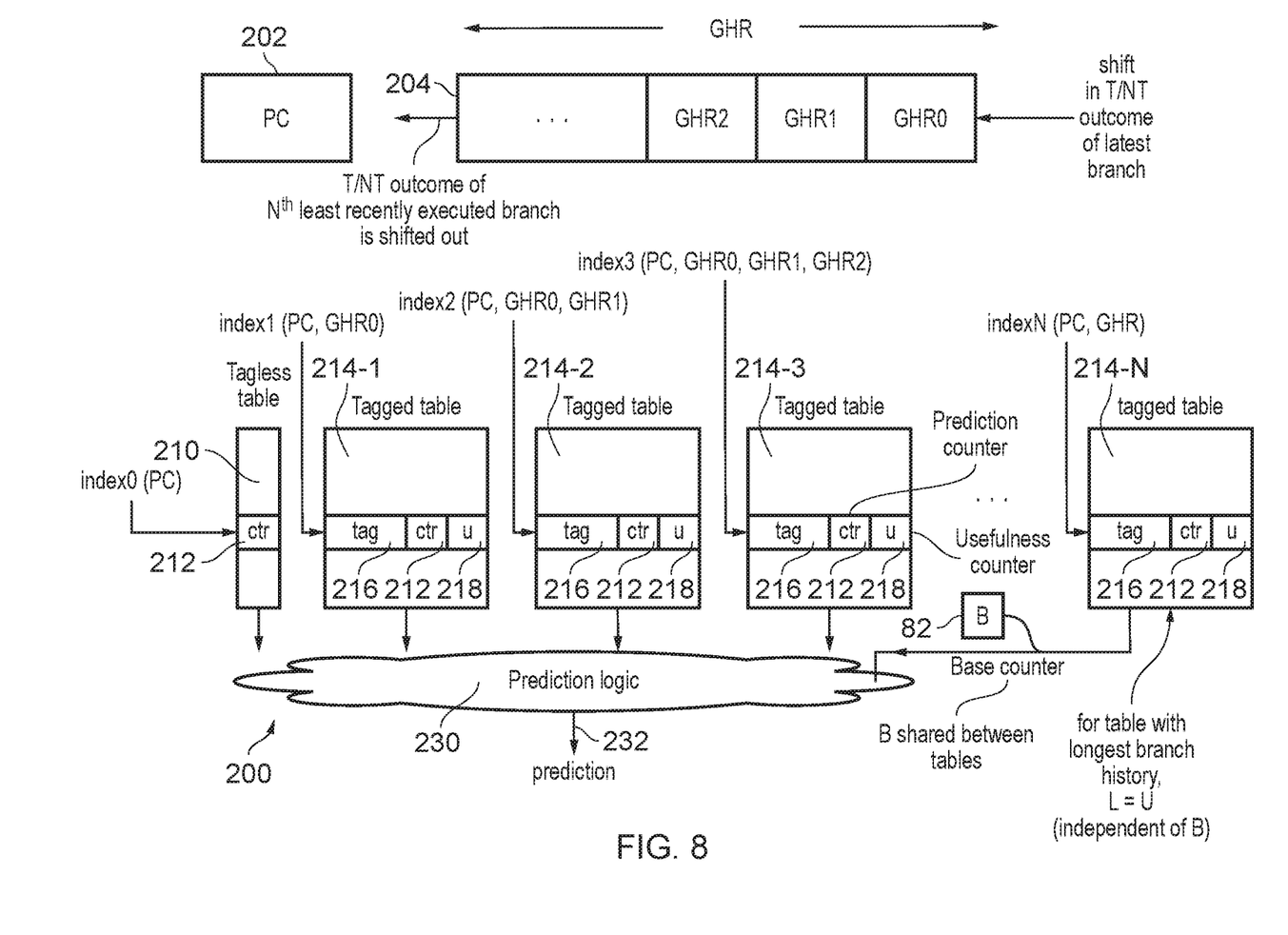
FIG. 8 shows an example of a tagged-geometric (TAGE) branch direction predictor.

The examples above have been described in relation to a general cache 50 which could be one of a number of types as mentioned above. FIG. 8 shows a more specific example applied to one of the branch prediction caches 42 within the branch predictor 40. The example of FIG. 8 shows a portion of a tagged-geometric (TAGE) branch direction predictor 200, which can be used to provide a prediction of whether a branch instruction included within a block of instructions at a given program counter (PC) address 202 is predicted taken or not taken. The TAGE branch direction predictor 200 is indexed based on the program counter 202 and further index information provided by a global history register (GHR) 204. The global history register 204 stores values which represent the taken/not taken (T/NT) outcomes of the N least recently executed branch instructions. Each time a branch instruction is predicted by the branch predictor, a bit of 1 or 0 identifying whether the outcome was predicted taken or not taken is shifted into the GHR 204 at one end and this causes the bit which is represented T/NT outcome of the Nth least recently executed branch to be shifted out of the GHR at the other end. Speculative updates to the GHR 204 based on mispredictions can be reversed if the direction of the branch determined at the execute stage differs from the predicted branch direction. Hence, the GHR captures a sequence of T/NT outcomes which can provide an indication of the path taken through a program to reach the instruction represented by the program counter 202. Considering the GHR 204 as part of the index information therefore allows for a higher branch prediction accuracy because different routes to the same instruction (which may be associated with different branch outcomes) can be distinguished. Although not shown in FIG. 8 for conciseness, a second non-speculative version of the GHR 204 may be maintained, updated based on actual results of branches at the execute stage, which can be used for indexing the tables 210, 214 on a prediction state update (as opposed to the speculative version of the GHR used on lookups to generate a branch prediction). Also the non-speculative version of the GHR can be used for restoring the speculative GHR on a misprediction, in some embodiments (or separate GHR restoration tracking information can be maintained).

The TAGE branch direction predictor 200 includes a set of prediction tables 210, 214 which are indexed based on different combinations of the program counter 202 and the GHR 204. A tagless table 210 includes a number of prediction entries each specifying a prediction counter 212, which is indexed based on the program counter 202 alone, without considering the GHR 204. The prediction counter 212 provides a number which represents both the T/NT prediction and a confidence with which that prediction is made. For example a maximum value of the counter 212 may represent the most confident taken prediction, a minimum value of the counter 212 may represent the most confident not taken prediction, and values between the minimum and maximum may represent taken or not taken predictions with less confidence. The determination of whether the prediction is to be taken or not taken may depend on whether the counter exceeds a certain threshold.

The branch direction predictor 200 also includes a number of TAGE tables 214 (also described as tagged tables or tagged-geometric tables), which provide entries which are each indexed based on the program counter 202 and one or more portions of the GHR 204. In this example there are N TAGE tables 214-1 to 214-N. Each TAGE table 214 includes entries which specify a tag value 216, a prediction counter 212 of the same type as that described for the tagless table 210 and an entry usefulness value (U) 218 used for cache replacement policy. For each TAGE table the index used to select which entry to read when looking up the branch direction predictor is based on the combination of the program counter 202 with a differently sized portion of the GHR 204. For the first TAGE table 214-1 the index is based on the PC 202 and the least significant portion GHR 0 of the GHR 204. For the next TAGE table 214-2 the index is based on the PC 202 and the least significant two portions GHR 0, GHR 1 of the GHR 204. For subsequent TAGE tables 214, the portion of the GHR 204 used to form the index gets progressively longer until for the final TAGE table 214-N the index is based on the entire GHR 204. The tags 216 in the entries within the TAGE tables are similarly based on progressively longer sequences of branch history information from the GHR 204.

When a branch is executed by the branch unit 24, then the outcome of that branch is used to update the prediction state within the various tables 210, 214 of the TAGE predictor 200. Before shifting the taken/not taken outcome of that latest branch into the GHR 204, the previous contents of the GHR and the program counter 202 are used to derive the respective indices into the TAGE tables 214 and the tagless table 210. On any hits, the corresponding prediction counter 212 may be incremented if the outcome of the latest executed branch was taken, or decremented if the outcome of the executed branch was not taken. The prediction counters 212 saturate at their minimum and maximum values so that they do not wrap around. Having updated the prediction state based on the outcome of the latest branch, the T/NT outcome is also shifted into the (non-speculative) GHR 204.

When performing a prediction lookup at the fetch stage 6, the current contents of the (speculative) GHR 204 and the PC 202 are used to form the respective indices into the tables 210/214, and the prediction logic 230 of the branch direction predictor identifies whether that set of indices hits in each of the tables. For the tagless table 210 a hit will always be generated, while for the tagged tables 214 a hit will be generated if the tag 216 in the indexed entry corresponds to a PC 202 and the GHR 204 used to generate the index. If more than one of the tables 210, 214 generates a hit then the prediction logic 230 selects as the prediction 232 to be output for the current program counter and GHR 204, the prediction output by the one of the TAGE tables detecting a hit which corresponds to the longest length of branch history taken from the GHR 204. Hence, if the final TAGE table 214-N generates a hit its prediction will be selected in preference to any other tables, while if the final TAGE table 214-N misses then the next highest table would be selected if it generates a hit, and so on so that the prediction for the longest possible branch history which generates a hit is selected. If none of the TAGE tables 214 generates a hit then the predictor falls back on the prediction provided by the tagless table 210. This approach can provide high prediction accuracy because it allows the predictor to trade off the increased likelihood of prediction accuracy associated with a table index based on longer branch history with the increased likelihood of hits in the prediction cache for tables indexed based on shorter branch history. While the branch history shown in the example FIG. 8 is a global history register updated with T/NT outcomes at branches, it would also be possible for a TAGE predictor to consider other forms of branch history of different lengths, such as a register which tracks branch instruction addresses or branch target addresses of a series of branches of different lengths.

In such a TAGE branch direction predictor 200, any of the tagged tables 214 may function as the cache 50 described above with the replacement policy controlled based on the entry usefulness value 218 and the base usefulness value 82 as discussed above. Here the entry usefulness value 218 may be equivalent to the entry usefulness value 70 discussed earlier. The TAGE tables 214 may behave in a similar way to the cache 50 and its associated cache replacement control logic 80 as discussed above (for conciseness the cache replacement control logic 80 is not shown in FIG. 8, but may still be provided). One difference between the TAGE tables 214 and the cache 50 described earlier is that the TAGE tables may be implemented as a direct-mapped cache rather than a set associative cache, i.e. for the TAGE tables 214 each set 62 described earlier may only include one cache entry 54 instead of multiple entries. Also, it may not be necessary for the entries of the TAGE tables 214 to include a valid bit 66, as for a branch direction predictor it may not be useful to identify invalid entries as entries for which no prediction state has yet been allocated may in any case have the prediction counter 212 initialised to indicate a not taken prediction, which may give the same effect as a lookup which missed in the cache (as the default may be to assume that there are no branches or any branches are to be not taken in the case where there is a miss in a branch direction predictor). Otherwise, the TAGE tables 214 may function in a similar way to the cache 50 described above, and cache replacement may be conformed based on a usefulness level for a given entry which is evaluated based on the difference between the entry's usefulness value U and the base usefulness value 82 B in the similar way as discussed above. The base usefulness value 82 may be shared between different TAGE tables 214 so it is not necessary to provide separate base usefulness storage for each table. This allows the usefulness of many entries within two or more TAGE tables 214 to be updated in response to a global usefulness reduction event, through a single write to a base usefulness storage region 82.

It is not essential to use the base usefulness value B for all of the TAGE tables 214. For example, for the TAGE table 214-N that is indexed/tagged based on the longest sequence of branch history, the replacement of entries may be determined only based on the individual entry usefulness values 218 of the cache entries within that table, rather than consulting the base usefulness value B. This is because in the final TAGE table 214-N, once a given entry has been established as being sufficiently useful to prevent it from being replaced, it is relatively unlikely that there would also be another sequence of branch history that aliases onto the same entry which would also provide a useful prediction, and so the likelihood is that if the useful entry was replaced, whatever other branch sequence replaces it may not provide as useful a prediction. Therefore, it may be desirable that entries in the final TAGE table 214-N are not replaced once they have been established as sufficiently useful, and so are not subject to the global usefulness reduction event. Hence, for the final TAGE table 214-N the usefulness level of a given entry could simply be determined by the cache replacement controller 80 as being equal to the entry usefulness value 218, independent of the base usefulness value 82. In the example of FIG. 8, only the final TAGE table 214-N which is indexed based on the entire contents of the global history register 204 has its replacement controlled ignoring the base usefulness counter 82. However, in other examples two or more of the TAGE tables 214 which are indexed based on the longest sequences of branch information could have their usefulness levels assessed independently of the base usefulness, and in this case only the remaining TAGE tables which are indexed and tagged based on shorter sequences of branch history may consult the base usefulness value B. Nevertheless, even if only a subset of the TAGE tables function as a cache equivalent to the cache 50 discussed above, the use of the base usefulness value B is still useful to reduce the overhead associated with a global usefulness reduction in those tables (and higher TAGE tables may not need to be subject to global usefulness reduction anyway).

Hence, in summary as for a TAGE branch direction predictor it is relatively likely that the same program counter may end up with many different entries within the respective TAGE tables corresponding to it, and eventually it may become established that the entry for that program counter within a particular TAGE table is the one that provides the greatest confidence and greatest usefulness, this may result in several entries in other TAGE tables corresponding to that program counter becoming redundant even if they previously did provide a correct prediction. Hence, it can be desirable to implement a global reset mechanism where over time entries are periodically reduced in usefulness, with the aim of being able to clear away the entries which are no longer being relied upon. Hence, implementation of a TAGE branch direction predictor may require the use of a global reset of usefulness to make them practical so that they do not end up being completely full of entries indicated as so useful that no replacement is possible again. The base usefulness value as discussed above greatly reduces the performance cost of implementing such a global reset mechanism, especially as it allows single-ported cache RAMs 196 to be used for the tagged table to avoid the cost of a second read/write port 194. Hence the technique discussed above can be particularly useful for the tagged tables 214 within the TAGE branch direction predictor.

For the TAGE example of FIG. 8, the entry usefulness event, which triggers incrementing of the entry usefulness value 218 of a given entry in a given TAGE table 214, may occur when the prediction from the given entry is selected by the prediction logic 230 and the prediction is determined to be correct at the execute stage 16.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
a cache comprising cache entries, each cache entry to store cached information and an entry usefulness value indicative of usefulness of the cached information;
base usefulness storage circuitry to store a base usefulness value shared among a group of multiple cache entries; and
cache replacement control circuitry to:
calculate a usefulness level for a given cache entry based on a difference between the entry usefulness value specified by the given cache entry and the base usefulness value stored in the base usefulness storage circuitry,
perform a comparison based on the difference for the given cache entry, and
control, based on the comparison, whether the given cache entry is selected for replacement.

2. The apparatus according to claim 1, in which in response to a global usefulness reduction event, the cache replacement control circuitry is configured to increment the base usefulness value stored in the base usefulness storage circuitry.

3. The apparatus according to claim 2, in which the global usefulness reduction event comprises elapse of a predetermined period since an initialization event or a previous global usefulness reduction event, or in which the global usefulness reduction event comprises a cache allocation metric exceeding a threshold.

4. The apparatus according to claim 1, in which when a new cache entry is to be allocated to the cache, the cache replacement control circuitry is configured to select which cache entry is selected for replacement based on the difference between the entry usefulness value specified by the given cache entry and the base usefulness value stored in the base usefulness storage circuitry.

5. The apparatus according to claim 3, in which the cache allocation metric comprises one of:
a number or rate of attempts to allocate new cache entries to the cache;
a number or rate of successful allocations of new cache entries to the cache;
a number or rate of failed allocations of new cache entries to the cache, where a failed allocation comprises the cache replacement control circuitry determining that a new cache entry cannot be allocated because no cache entry is able to be selected for replacement.

6. The apparatus according to claim 1, in which in response to an entry usefulness event indicative of cached information in a particular cache entry being found to be useful, the cache replacement control circuitry is configured to increment the entry usefulness value for the particular cache entry.

7. The apparatus according to claim 6, in which the entry usefulness event comprises one of:
a cache hit detected for the particular cache entry;

where the cached information comprises prediction information indicative of a prediction for controlling speculative operations, determination of at least one of: the prediction provided by the particular cache entry being correct, and the prediction provided by the particular cache entry being selected to form a prediction in preference to a prediction from at least one other entry.

8. The apparatus according to claim 1, in which the cache replacement control circuitry is configured to prevent the given cache entry being selected for replacement when the usefulness level is greater than or equal to a predetermined threshold.

9. The apparatus according to claim 1, in which when the entry usefulness value for the given cache entry is less than the base usefulness value, the cache replacement control circuitry is configured to determine the usefulness level for the given cache entry to be the same as the usefulness level that would be determined for the given cache entry when the entry usefulness value equals the base usefulness value.

10. The apparatus according to claim 1, comprising below-base-usefulness checking circuitry to:
identify one or more below-base-usefulness cache entries for which the entry usefulness value is less than the base usefulness value, and
for said one or more below-base-usefulness cache entries, update the entry usefulness value to be equal to the base usefulness value.

11. The apparatus according to claim 1, in which the cache comprises at least one module of single-ported random access memory.

12. The apparatus according to claim 1, in which the cache comprises one of:
a data cache;
an instruction cache; and
an address translation cache.

13. The apparatus according to claim 1, in which the cache comprises a predictive storage structure for which the cached information comprises prediction information indicative of a prediction for controlling speculative operations.

14. The apparatus according to claim 1, in which the cache comprises a branch prediction structure for which the cached information comprises branch prediction information indicative of predicted branch instruction behaviour.

15. The apparatus according to claim 1, in which:
said cache comprises a subset of a plurality of tagged-geometric (TAGE) tables of a TAGE branch direction predictor;
for each TAGE table, the cache entries specify at least a tag, a branch direction prediction indication indicative of a prediction of whether a branch should be taken, and said entry usefulness value; and
for different TAGE tables among said plurality of TAGE tables, the tag depends on different lengths of branch history information.

16. The apparatus according to claim 15, in which the base usefulness value is shared between at least two TAGE tables of said subset.

17. The apparatus according to claim 15, in which:
said subset of TAGE tables excludes at least one TAGE table for which the cache replacement control circuitry is configured to determine whether one of the cache entries in said at least one TAGE table is selected for replacement based on the entry usefulness value of said one of the cache entries, independent of the base usefulness value stored in the base usefulness storage circuitry.

18. The apparatus according to claim 17, in which for said at least one TAGE table excluded from the subset, the tag depends on a longer length of branch history information than for said subset of TAGE tables.

19. An apparatus comprising:
means for caching, comprising cache entries, each cache entry to store cached information and an entry usefulness value indicative of usefulness of the cached information;
means for storing a base usefulness value shared among a group of multiple cache entries; and
means for controlling to:
calculate a usefulness level for a given cache entry based on a difference between the cache entry usefulness value specified by the given cache entry and the base usefulness value stored in the means for storing,
perform a comparison based on the difference for the given cache entry, and
control, based on the comparison, whether the given cache entry is selected for replacement.

20. A method comprising:
storing cache entries in a cache, each cache entry comprising cached information and an entry usefulness value indicative of usefulness of the cached information;
storing a base usefulness value shared among a group of multiple cache entries in base usefulness storage circuitry;
calculating a usefulness level for a given cache entry based on a difference between the entry usefulness level specified by the given cache entry and the base usefulness value stored in the base usefulness storage circuitry;
performing a comparison based on the difference for the given cache entry; and
controlling whether the given cache entry is selected for replacement, based on the comparison.

* * * * *